June 6, 1933.  C. F. JAEGER  1,913,053
CHASSIS STRUCTURE
Filed April 6, 1931   2 Sheets-Sheet 2
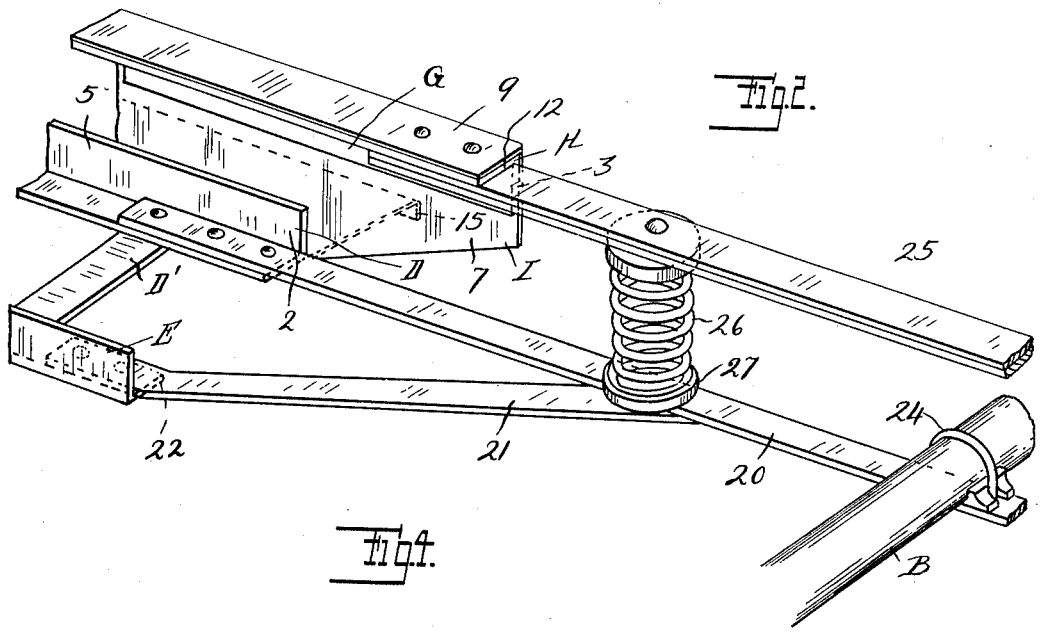
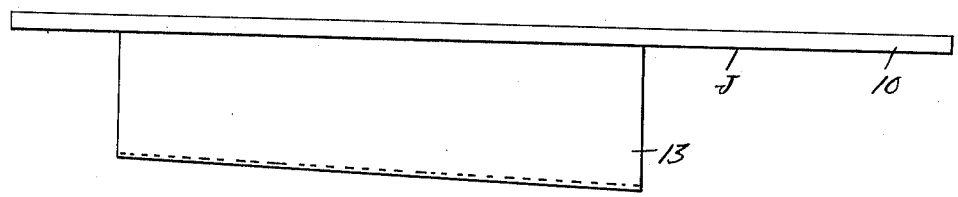
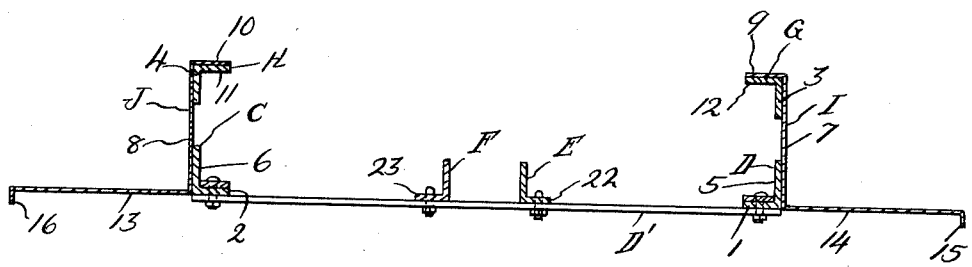
INVENTOR
Charles F. Jaeger
BY
Whittemore, Hulbert, Whittemore & Belknap
ATTORNEYS Patented June 6, 1933

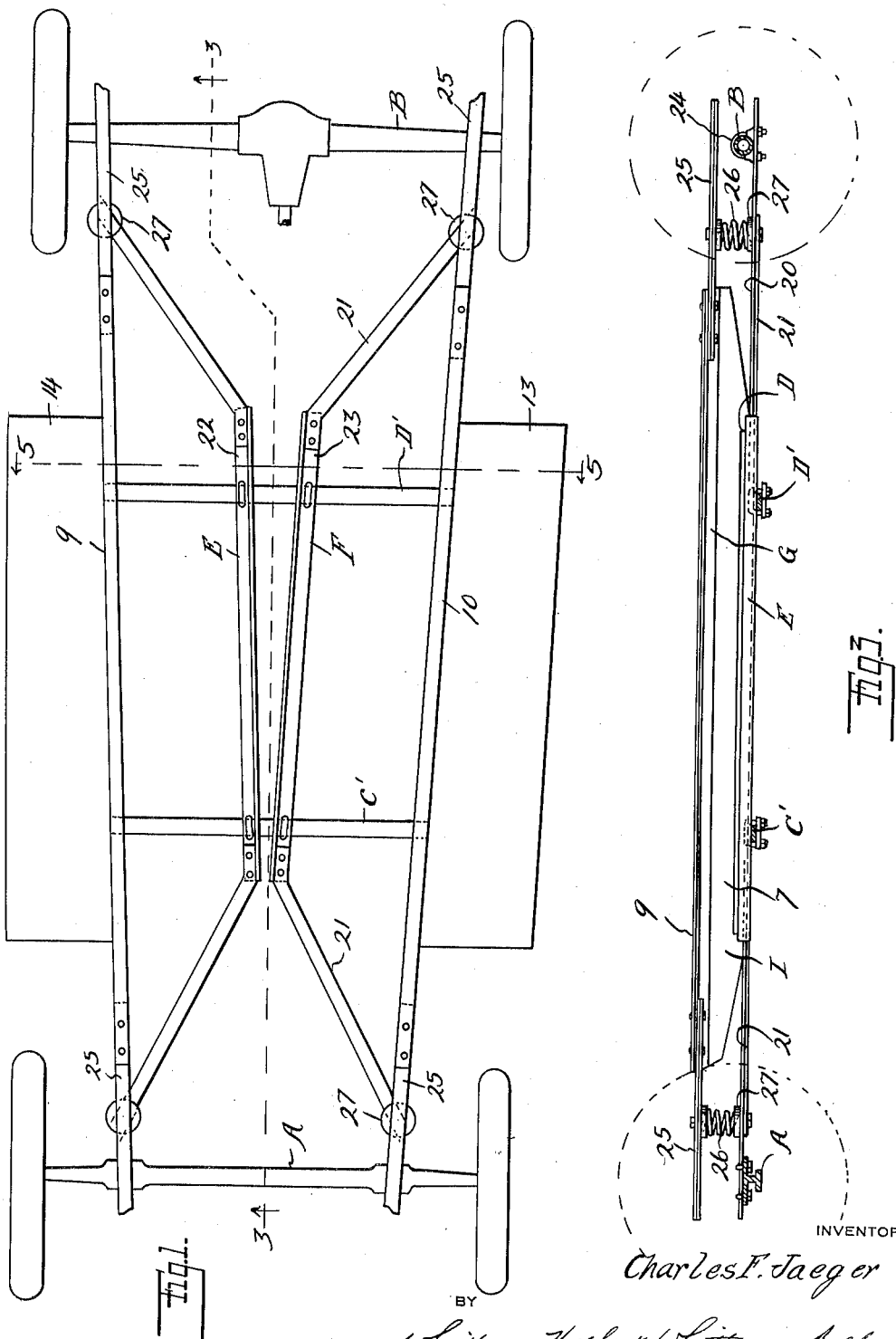

1,913,053

UNITED STATES PATENT OFFICE

CHARLES F. JAEGER, OF FERNDALE, MICHIGAN

CHASSIS STRUCTURE

Application filed April 6, 1931. Serial No. 528,206.

This invention relates generally to vehicle chassis structures and consists of certain novel features of construction, combinations and arrangements of parts that will be hereinafter more fully described and particularly pointed out in the appended claims.

In the accompanying drawings:

Figure 1 is a fragmentary top plan view of a structure embodying my invention;

Figure 2 is a fragmentary perspective view thereof;

Figure 3 is a section taken on the line 3—3 of Figure 1;

Figure 4 is a detail view of one of the pressed metal members;

Figure 5 is a sectional view taken on the line 5—5 of Figure 1.

Referring now to the drawings, A and B respectively are the front and rear axles; C and D respectively are the main sills; C' and D' are the cross bars; E and F respectively are the auxiliary sills, and G and H respectively are the vehicle body supporting rails of a chassis structure embodying my invention. As shown, the main sills C and D are L-shape in cross section and terminate short of the front and rear axles A and B. The cross bars C' and D' are substantially flat and are rigidly secured to the bases 1 and 2 respectively of the main sills adjacent the ends thereof, and the auxiliary sills E and F are rigid with the cross bars C' and D' and preferably diverge rearwardly from a point in advance of the forward cross bar C' to a point in rear of the rear cross bar D'. The vehicle body supporting rails G and H are located above the main sills C and D and are L-shape in cross section. Preferably the vertical webs 3 and 4 of the rails are in vertical alignment with the vertical webs 5 and 6 respectively of the main sills. Pressed metal members I and J respectively of substantially Z cross section have the vertical webs 7 and 8 respectively thereof rigidly secured to the vertically aligned webs of the main sills and rails and are substantially equal in length to the rails G and H. As illustrated in Figure 2, the uppermost horizontal portions 9 and 10 of the members I and J extend inwardly of and are rigidly secured to the horizontal portions 11 and 12 respectively of the rails, while the lowermost horizontal portions 13 and 14 of the members project laterally outwardly and are provided at their outer longitudinal edges with depending stiffening flanges 15 and 16 respectively. Preferably the vertical portions 7 and 8 of the members constitute kick boards while the horizontal portions 13 and 14 respectively thereof constitute running boards of the vehicle.

In the present instance flexible connections are provided between the sills and the front and rear axles of the vehicle. As shown, bars 20 of spring steel are rigidly secured to the bases 1 and 2 respectively of the main sills and extend across the axles A and B, while other bars 21 of spring steel are rigidly secured to the bases 22 and 23 respectively of the auxiliary sills E and F and overlap the bars 20 adjacent the axles. Suitable U bolts 24 are used to secure the overlapping bars 20 and 21 to the axles. In addition laminated bars 25 are rigidly secured to the overlapping horizontal portions of the main sills and pressed metal members and project therefrom in substantially parallel relation to the bars 20 while coil springs 26 extend between said parallel bars 20 and 25 and have opposite ends thereof anchored in cups 27 bolted to the bars 20 and 25 respectively.

Thus with this construction the main sills C and D and vehicle body supporting rails G and H are rigid with the pressed metal members I and J and the latter serve the dual function of kick boards and running boards for the vehicle. Hence an extremely compact and sturdy structure is provided. Moreover, the flexible connections between the sills and axles are such that a vehicle body supported upon the rails G and H will be effectively cushioned. One of the objects of the present invention is to provide a sturdy but easy riding chassis structure wherein the usual leaf springs are dispensed with entirely. Moreover a chassis constructed in accordance with the present invention may be disposed lower to the ground thereby reducing the over-all height of motor vehicles and lowering the center of gravity. In addition such a structure can be manufactured at a minimum cost.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a chassis structure, a front axle, a rear axle, a sill extending between and terminating short of said axles, a vehicle body supporting rail, a rigid connection between said rail and sill, connections between said sill and axles including bars of spring metal secured to said sill and axle, a bar of spring metal secured to said rail, and a yieldable connection between said bars.

2. In a chassis structure, a front axle, a rear axle, a main sill between and terminating short of said axles, an auxiliary sill substantially parallel to the main sill, connections between said sills, and connections between said sills and axles including bars of spring metal secured to and projecting from the ends of said sills, the bars projecting from the auxiliary sills crossing over and having portions secured to the bars projecting from the main sills.

3. In a chassis structure, a pair of sills arranged side by side, a bar of flexible metal secured to and projecting endwise from one of said sills, and a bar of flexible metal secured to and projecting endwise from the other sill and having a portion crossing over and secured to the flexible bar aforesaid.

4. In a chassis structure, a pair of sills arranged side by side, a bar of flexible metal secured to and projecting endwise from one of said sills, and a bar of flexible metal having end portions extending longitudinally of and secured to said bar and the other sill.

5. In a chassis structure, a main sill and a body rail arranged in a common vertical plane, an auxiliary sill beside the main sill, a connection between said main sill and rail, a bar of spring metal secured to and projecting endwise from the main sill, a bar of spring metal secured to and projecting endwise from the rail, a bar of spring metal secured to and projecting endwise from the auxiliary sill and having a portion crossing over and overlapping the first-mentioned bar, and a spring extending between the first and second-mentioned bars adjacent the crossover portion of the third-mentioned bar.

6. In a chassis structure, a pair of main sills, a pair of auxiliary sills, bars of flexible metal projecting endwise from the main sills, bars of flexible metal projecting endwise from the auxiliary sills, having portions extending over to the bars aforesaid and having portions overlapping and secured to said first mentioned bars whereby the sills and bars form two trusses arranged side by side, and connections between said trusses including bars crossing and secured to said main and auxiliary sills.

7. In a chassis structure, front and rear axles, sills extending between but terminating short of said axles, bars of flexible material secured to and projecting endwise from said sills, means connecting said bars to said axles, vehicle body supporting rails above and substantially parallel to said sills, connections between said bars and sills, bars secured to and projecting endwise from said rails in substantially parallel relation to the bars aforesaid and coil springs extending between the parallel bars at points substantially midway between said sills and axles.

8. In a chassis structure, front and rear axles, sills extending between but terminating short of said axles, bars of flexible material secured to and projecting endwise from said sills, means connecting said bars to said axles, auxiliary sills between the sills aforesaid and terminating short of said axles, cross bars connected to said first mentioned and auxiliary sills intermediate the ends thereof, and bars of flexible material having portions secured to and projecting endwise from the auxiliary sills and having portions overlapping and secured to the bars aforesaid.

9. In a chassis structure, front and rear axles, sills extending between but terminating short of said axles, bars of flexible material secured to and projecting endwise from said sills, means connecting said bars to said axles, vehicle body supporting rails above and substantially parallel to said sills, connections between said bars and sills, bars secured to and projecting endwise from said rails substantially in parallel relation to the bars aforesaid, auxiliary sills between the sills aforesaid and terminating short of said axles, cross bars connected to said first mentioned and auxiliary sills intermediate the ends thereof, bars of flexible material having portions secured to and projecting endwise from the auxiliary sills and having portions overlapping and secured to the first mentioned bars, and coil springs extending between the parallel bars at approximately the juncture of the last and first mentioned bars.

10. In a chassis structure, front and rear axles, sills extending between said axles, connections between said sills and axles including means extending endwise from said sills, cross bars connected to said sills at spaced points longitudinally thereof, auxiliary sills secured to said cross bars and diverging rearwardly from points in advance of the forward cross bar to points in rear of the rear cross bar, and connections between said auxiliary sills and endwise extending means including means extending endwise from said auxiliary sills.

11. In a chassis structure, front and rear axles, sills extending between said axles, connections between said sills and axles including means extending endwise from said sills, cross bars connected to said sills at spaced points longitudinally thereof, auxiliary sills secured to said cross bars, and connections between said auxiliary sills and endwise extending means aforesaid including means extending endwise from said auxiliary sills.

12. In a chassis structure, front and rear axles, sills extending between said axles, connections between said sills and axles including flexible members extending endwise from said sills, cross bars connected to said sills at spaced points longitudinally thereof, auxiliary sills secured to said cross bars, and connections between said auxiliary sills and endwise extending members including flexible members extending endwise from said auxiliary sills.

13. In a chassis structure, a front axle, a rear axle, main and auxiliary sills extending between but terminating short of said axles, cross bars rigid with said sills, and flexible connections between said main and auxiliary sills and said axles including bars of spring metal secured to said main sills and said axles, and bars of spring metal secured to the auxiliary sills and having portions overlapping and secured to the first mentioned bars.

14. In a chassis structure, a sill of substantially L cross section, a vehicle body rail of inverted L cross section spaced directly above said sill, the bases of the L's being substantially parallel and the upright portions of the L's being substantially in vertical alignment, and a connection between said rail and sill including a substantially flat pressed metal member secured against the upright portions of said L's and provided at its upper and lower edges with oppositely extending flanges, the flange at its upper edge overlapping and secured to the base of the upper L, and the flange at the lower edge projecting away from the base of the lower L substantially in the horizontal plane thereof and constituting a running board.

In testimony whereof I affix my signature.

CHARLES F. JAEGER.